US009784427B2

(12) United States Patent
Stemmer et al.

(10) Patent No.: US 9,784,427 B2
(45) Date of Patent: Oct. 10, 2017

(54) BACKLIT ILLUMINATED DEVICE WITH LIGHTING THROUGH DECORATIVE PLATED SURFACES

(71) Applicant: GM GLOBAL TECHNOLOGY OPERATIONS LLC, Detroit, MI (US)

(72) Inventors: Joseph A. Stemmer, Warren, MI (US); Neil Naik, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 14/808,490

(22) Filed: Jul. 24, 2015

(65) Prior Publication Data

US 2016/0201874 A1    Jul. 14, 2016

Related U.S. Application Data

(60) Provisional application No. 62/101,610, filed on Jan. 9, 2015.

(51) Int. Cl.
| | | |
|---|---|---|
| G09F 13/04 | (2006.01) |
| F21V 3/04 | (2006.01) |
| F21V 23/00 | (2015.01) |
| F21V 8/00 | (2006.01) |
| F21S 8/10 | (2006.01) |

(Continued)

(52) U.S. Cl.
CPC .......... *F21V 3/0472* (2013.01); *B60R 13/005* (2013.01); *F21S 48/215* (2013.01); *F21V 3/049* (2013.01); *F21V 23/003* (2013.01); *G02B 6/0001* (2013.01); *G02B 6/0021* (2013.01); *F21W 2101/00* (2013.01); *F21W 2121/00* (2013.01); *F21Y 2115/10* (2016.08); *G02B 6/0051* (2013.01); *G09F 2013/044* (2013.01)

(58) Field of Classification Search
CPC .... B60R 13/005; F21S 48/215; F21V 23/005; F21V 23/0472; F21V 23/047; F21Y 2115/10; F21W 2101/00; F21W 2121/00; G02B 6/0051
See application file for complete search history.

(56) References Cited

U.S. PATENT DOCUMENTS 5,806,957 A * 9/1998 Prior ..................... B60R 13/005
                                                            362/267
7,712,933 B2 * 5/2010 Fleischmann ........ B60Q 1/2696
                                                            362/495
(Continued)

FOREIGN PATENT DOCUMENTS

CN       202175002 U       3/2012
CN       103635356 A       3/2014
(Continued)

*Primary Examiner* — Ali Alavi
(74) *Attorney, Agent, or Firm* — Quinn IP Law

(57) ABSTRACT

An ornamental device including a decorative plated surface and a backlit assembly is described, and includes a light engine including a light-emitting diode (LED), a light pipe optically coupled to the LED, a light diffuser and a lens assembly. The lens assembly includes a chrome surface finish, wherein the lens assembly encases the light engine, the light pipe and the light diffuser, and is assembled onto a back plate. When the LED is not illuminated, the lens assembly exhibits a chrome appearance, and when the LED is illuminated, light emanates through the lens assembly.

20 Claims, 3 Drawing Sheets

(51) Int. Cl.
  *B60R 13/00*   (2006.01)
  *F21W 101/00*   (2006.01)
  *F21W 121/00*   (2006.01)
  *F21Y 115/10*   (2016.01)

(56) References Cited

U.S. PATENT DOCUMENTS

| | | | | |
|---|---|---|---|---|
| 7,855,755 | B2* | 12/2010 | Weller | B60R 1/12 340/425.5 |
| 8,637,883 | B2* | 1/2014 | Chakraborty | H01L 33/44 257/100 |
| 8,820,962 | B2* | 9/2014 | Kang | F21V 3/00 362/236 |
| 2005/0277448 | A1* | 12/2005 | Castaneda | H04M 1/23 455/575.1 |
| 2006/0023468 | A1* | 2/2006 | Takahashi | B60R 13/005 362/555 |
| 2009/0277059 | A1* | 11/2009 | Kwon | B60Q 1/50 40/581 |
| 2011/0052839 | A1* | 3/2011 | Pierce | B60R 13/005 428/31 |
| 2011/0123731 | A1* | 5/2011 | Zanini | B44C 5/00 428/31 |
| 2012/0182722 | A1* | 7/2012 | Wu | B60R 13/005 362/157 |
| 2013/0196089 | A1* | 8/2013 | Ostrander | B60R 13/005 428/31 |
| 2014/0204599 | A1* | 7/2014 | Miura | B60Q 1/2661 362/501 |

FOREIGN PATENT DOCUMENTS

| | | |
|---|---|---|
| CN | 102422189 A | 4/2014 |
| CN | 104097571 A | 10/2014 |
| KR | 101453936 B1 | 10/2014 |

\* cited by examiner

BACKLIT ILLUMINATED DEVICE WITH LIGHTING THROUGH DECORATIVE PLATED SURFACES

CROSS-REFERENCE TO RELATED APPLICATIONS

This application claims the benefit of U.S. Provisional Patent Application No. 62/101,610 filed on Jan. 9, 2015, the disclosure of which is hereby incorporated by reference.

TECHNICAL FIELD

The disclosure relates to illuminated devices, including backlit illuminated ornamental devices that have metalized, chrome or other decorative plated surfaces where light is emitted through the plated surface.

BACKGROUND

A light pipe is a form of an optical waveguide in the form of a physical structure that transports or distributes light for the purpose of directed illumination of an area or a location.

SUMMARY

An ornamental device including a decorative plated surface and a backlit assembly is described, and includes a light engine including a light-emitting diode (LED), a light pipe optically coupled to the LED, a light diffuser and a lens assembly. The lens assembly includes a chrome surface finish, wherein the lens assembly encases the light engine, the light pipe and the light diffuser, and is assembled onto a back plate. When the LED is not illuminated, the lens assembly exhibits a chrome appearance, and when the LED is illuminated, light emanates through the lens assembly.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
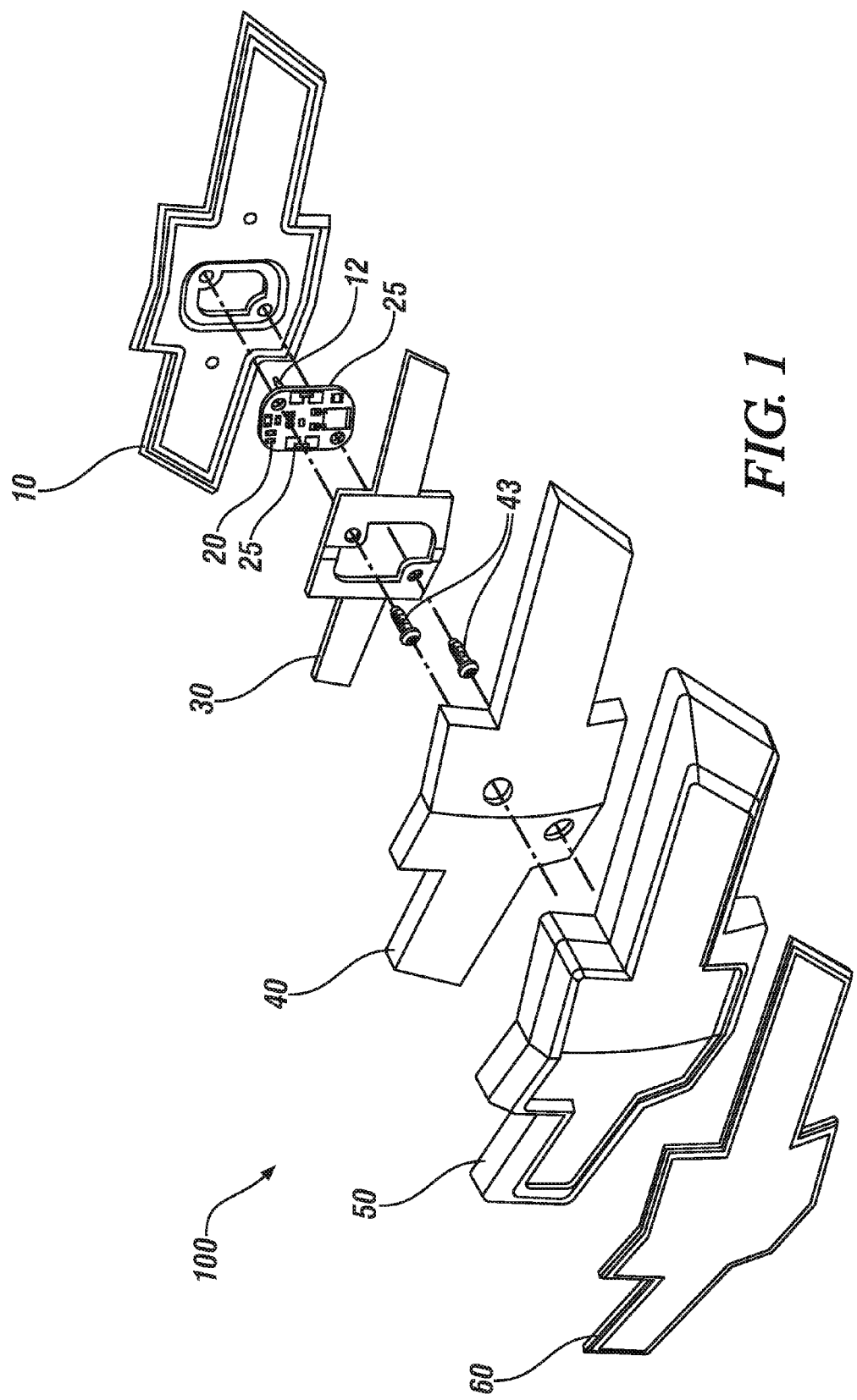
FIG. 1 shows an isometric exploded view of a backlit ornamental device including a back plate, a light engine including at least one light-emitting diode (LED), a light pipe, a light diffuser, a chromed lens assembly, and an emblem insert, in accordance with the disclosure.

Referring now to the drawings, wherein the depictions are for the purpose of illustrating certain exemplary embodiments only and not for the purpose of limiting the same, FIG. 1 shows an isometric exploded view of a backlit ornamental device 100 that may be illuminated. The backlit ornamental device 100 includes a back plate 10, a light engine 20 including one or a plurality of light-emitting diodes (LEDs) 25, a light pipe 30, a light diffuser 40, a chromed lens assembly 50, assembly fasteners 43, and in one embodiment an emblem insert 60. As shown, two LEDs 25 are employed. The backlit ornamental device 100 may be any suitable shape, including being configured in the shape of an emblem in one embodiment. The backlit ornamental device 100 may be customized for multiple part design characteristics, including complex geometric shapes, multi-colored lighting effects, and multi-color unlighted or non-lit surface finishes. Like numerals indicate like or corresponding parts throughout the several views. The backlit ornamental device 100 may have a complex geometric shape, including, e.g., sharp or acute corners, small radii, and deep pockets.

The back plate 10 is a rear housing cover for the backlit ornamental device 100 that includes mounting studs or other devices on which the light engine 20 and light pipe 30 can be assembled. The back plate 10 is preferably injection-molded in any suitable shape, and includes features that permit it to be assembled onto a surface, such as a surface of a vehicle body, employing suitable techniques such as adhesive bonding, fasteners, or other devices. A main plane of the back plate 10 preferably conforms to the surface of the vehicle body. The back plate 10 also includes one or more pass-through conduits through which electrical cables pass to connect an electrical power supply 12, e.g., from the vehicle to the light engine 20.

Figure 2:
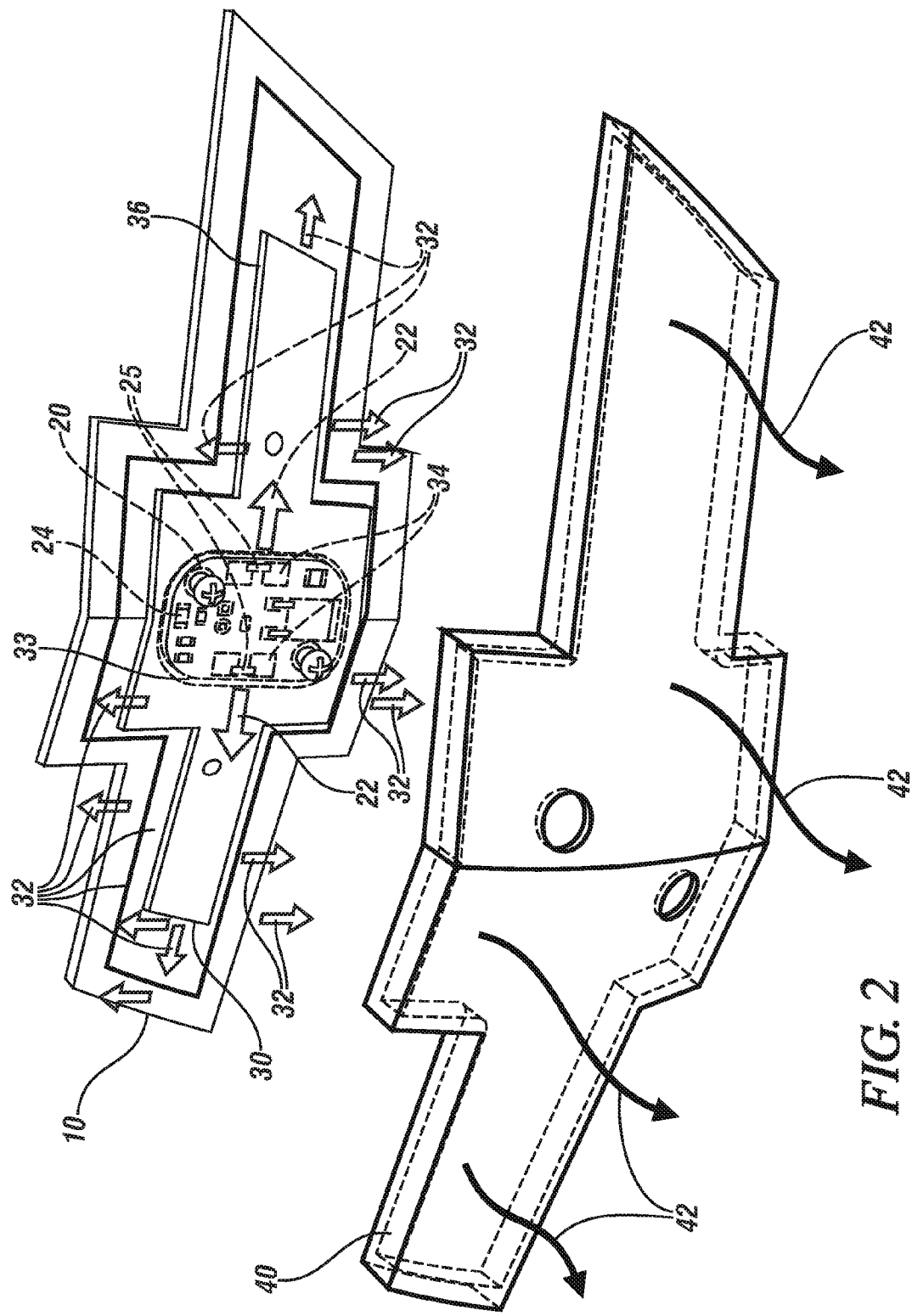
FIG. 2 shows an isometric exploded view of the back plate, light engine and light pipe, in accordance with the disclosure.

FIG. 2 shows an isometric exploded view of the back plate 10, light engine 20 and light pipe 30. The light engine 20 includes a printed circuit board (PCB) 24 electrically connected to one or a plurality of LED(s) 25. Two LEDs 25 are shown. The LEDs 25 are preferably surface-mounted onto the PCB 24 in a manner that permits optical coupling with the light pipe 30. The PCB 24 includes electrical circuitry and components that channel a suitable amount of electric power from the electrical power supply 12 to the LEDs 25 to effect their illumination. Each LED 25 may emanate white light or another light in the visible spectrum, and may be covered with a lens that is transparent or, alternatively, a lens having a suitable color, e.g., red, green, blue or other.

The light pipe 30 is an elongated transparent medium for transmitting light. In one embodiment, and as shown, the light pipe 30 is a rigid flat device fabricated from a hard plastic transparent material, e.g., polycarbonate or another transparent resin, that directs illuminated light generated by the LED 25 from an LED optical interface surface 34 formed on an inner periphery 33 thereof to an outer periphery 36 of the light pipe 30. Preferably the light pipe 30 has a shape that approximates the shape of the backlit ornamental device 100, albeit at lesser dimensions. Each of the LEDs 25 is proximal to the corresponding LED optical interface surface 34 of the light pipe 30 to minimize loss of light intensity through the LED optical interface surface 34. The LED optical interface surface 34 is preferably designed to entrain all the light radiating from the proximal LED 25 and minimize occurrence of reflected or refracted light. Generally speaking, the brightness emitted from the light pipe 30 depends upon design features of the LED 25 and the geometric shape of the backlit ornamental device 100. A properly matched light pipe 30 emits the same brightness as the individual LED 25, minimizing the light lost. The LED 25 is matched to the LED optical interface surface 34 of the light pipe 30 to permit capture of the radiated light with minimal light loss. Effective light pipe and LED matching occurs when an LED radiation pattern angle matches an acceptance pattern angle of the LED optical interface surface 34 of the light pipe 30.

The light diffuser 40 is an injection-molded element fabricated from translucent plastic material that completely encases the light pipe 30 and light engine 20. An outer periphery of the light diffuser 40 sealably assembles onto the back plate 10. The light diffuser 40 preferably has a matte finish. The light diffuser 40 breaks up and distributes light emanating from the LED 25 and reduces or eliminates bright spots caused by the light emanating from the LED 25.

Elements 22 indicate light emanating from the LEDs 25. Elements 32 indicate light originating from the LEDs 25 and emanating from the outer periphery 36 of the light pipe 30. Elements 42 indicate light originating from the LEDs 25 and emanating from the outer periphery 36 of the light pipe 30 and then emanating from the light diffuser 40. The foregoing light emanations 22, 32 and 42 are non-limiting illustrations of light emanations.

Figure 3:
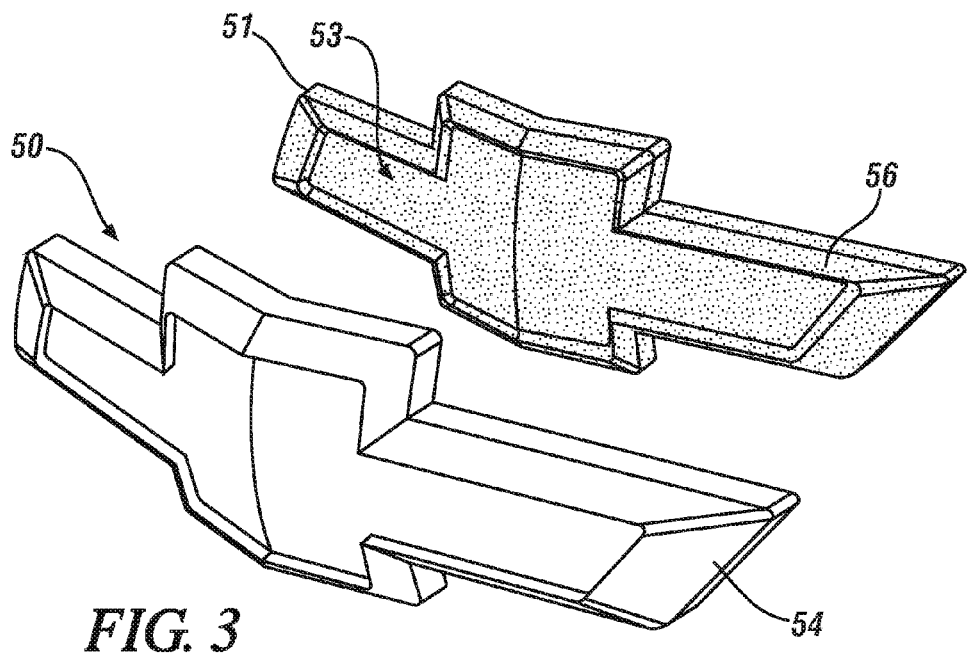
FIG. 3 shows an isometric exploded view of the chromed lens assembly including a coated inner lens that sealably assembles within a transparent or translucent outer lens, in accordance with the disclosure.

FIG. 3 shows an isometric exploded view of the chromed lens assembly 50 including a coated inner lens 51 that sealably assembles within an outer lens 54 that may be either transparent or translucent. The coated inner lens 51 is assembled adjacent to the light diffuser 40. The coated inner lens 51 is an injection-molded transparent or translucent element that has been completely uniformly coated with a chrome layer 53 on one surface, preferably an outer surface. The chrome layer 53 is preferably applied on the outer surface at a predetermined thickness using a physical vapor deposition (PVD) process to provide a chrome surface finish 56. The PVD process provides a decorative-plated chrome-like surface finish and appearance that is permeable to light emanating from the LED 25. The PVD process may be applied to fabricate the coated inner lens 51 to provide the chrome surface finish 56 regardless of complexity of the surface geometries thereof. The outer lens 54 protects the coated inner lens 51 from physical impingements, and the coated inner lens 51 permits light to permeate therethrough.

The emblem insert 60 is an opaque or translucent element that assembles onto an outer surface of the chromed lens assembly 50. The emblem insert 60 preferably covers a portion of the chromed lens assembly 50 and acts as a mask to prevent or reduce light emanation originating from the LED 25 through the covered portion.

The backlit ornamental device 100 includes the chrome surface finish 56 from the chromed lens assembly 50. As such, when the backlit ornamental device 100 is in an unlit state, i.e., when the LEDs 25 are not illuminated, the appearance of the backlit ornamental device 100 reflects the chrome surface finish 56 in those portions of the coated lens 50 that are not covered by the emblem insert 60. When the backlit ornamental device 100 is illuminated by the LEDs 25, the backlit ornamental device 100 emanates light through the chrome surface finish 56 in those portions of the chromed lens assembly 50 that are not covered by the emblem insert 60.

When the backlit ornamental device 100 is assembled onto an exterior surface of a vehicle, it may be electrically connected to a vehicle lighting system. As such, the LEDs 25 may be illuminated when the vehicle lighting system is activated, and the LEDs 25 may be in the OFF state, i.e., not illuminated when the vehicle lighting system is not activated. When the LEDs 25 are in the OFF state, the backlit ornamental device 100 exhibits an appearance of chrome and chrome-like surface finishes. Likewise, when the LEDs 25 are in the ON state, light from the LEDs 25 emanates directly through the surfaces of the chromed lens assembly 50. Such a configuration may be customized for multiple part design characteristics, including complex geometric shapes, multi-colored lighting, and multi color non-lit surface finishes.

Figure 4:
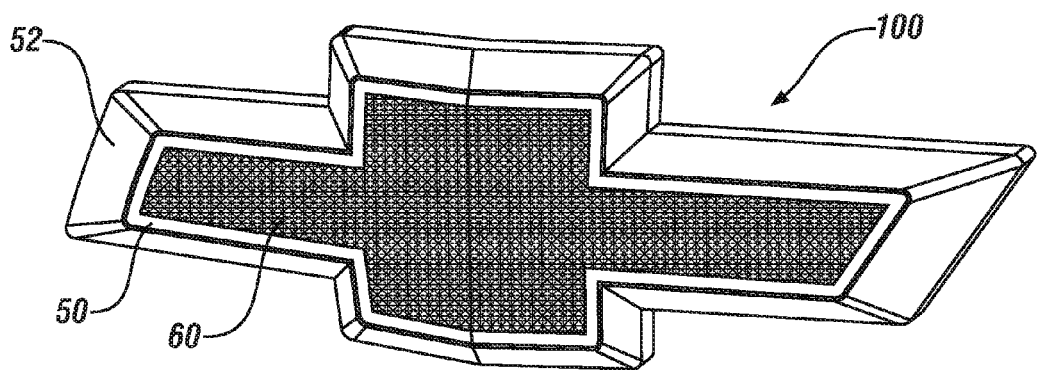
FIG. 4 shows an isometric assembled view of the backlit ornamental device in an illuminated state, in accordance with the disclosure.

FIG. 4 shows an isometric assembled view of the backlit ornamental device 100 in an illuminated state, including light 52 emanating from a portion of the chromed lens assembly 50 not covered by the emblem insert 60.

Figure 5:
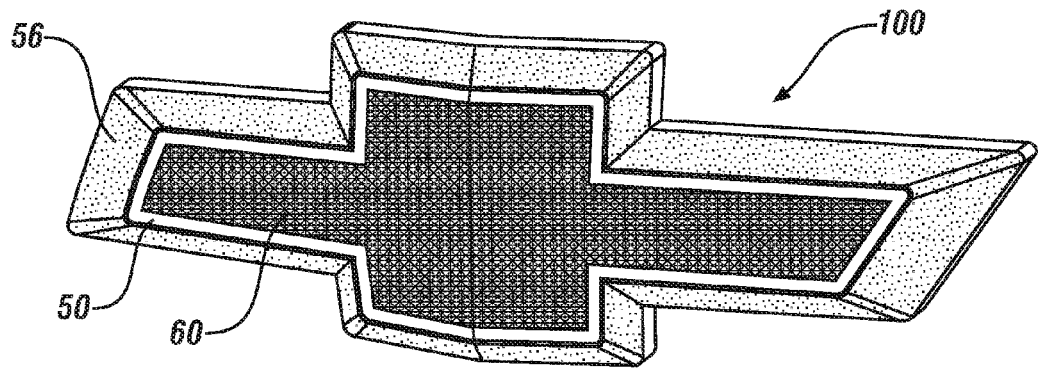
FIG. 5 shows an isometric assembled view of the backlit ornamental device in an unilluminated state, in accordance with the disclosure.

FIG. 5 shows an isometric assembled view of the backlit ornamental device 100 in an unilluminated state, including exhibiting the chrome surface finish 56 on the portion of the chromed lens assembly 50 not covered by the emblem insert 60.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An ornamental device including a decorative plated surface and a backlit assembly, comprising:
    a light engine including a light-emitting diode (LED);
    a light pipe optically coupled to the LED;
    a light diffuser; and
    a lens assembly including a chrome surface finish, wherein the lens assembly encases the light engine, the light pipe and the light diffuser, and is assembled onto a back plate;
    wherein when the LED is not illuminated, the lens assembly exhibits a chrome appearance; and
    wherein when the LED is illuminated, light emanates through the lens assembly.

2. The ornamental device of claim 1, further comprising the light engine including the LED assembled onto the back plate.

3. The ornamental device of claim 1, further comprising an emblem insert assembled onto and covering a portion an outer surface of the lens assembly.

4. The ornamental device of claim 3, wherein the emblem insert comprises a translucent element.

5. The ornamental device of claim 3, wherein the emblem insert comprises an opaque element.

6. The ornamental device of claim 3, wherein when the LED is not illuminated, the lens assembly exhibits a chrome appearance over a portion of the lens assembly that is not covered by the emblem insert.

7. The ornamental device of claim 3, wherein when the LED is illuminated, light emanates through the lens assembly through a portion of the lens assembly that is not covered by the emblem insert.

8. The ornamental device of claim 7, wherein the LED includes a transparent lens, and wherein light emanates through portions of the lens assembly that are not covered by the emblem insert when the LED is illuminated.

9. The ornamental device of claim 7, wherein the LED includes a colored lens, and wherein non-white light emanates through portions of the lens assembly that are not covered by the emblem insert when the LED is illuminated.

10. The ornamental device of claim 1, wherein the light engine including an LED further comprises the light engine assembled onto the back plate and electrically connected to an electric power source.

11. The ornamental device of claim 1, wherein the lens assembly including the chrome surface finish further comprises a coated inner lens including the chrome surface finish sealably assembled within an outer lens.

12. The ornamental device of claim 11, wherein the outer lens comprises a transparent outer lens.

13. The ornamental device of claim 11, wherein the outer lens comprises a translucent outer lens.

14. The ornamental device of claim 11, wherein the coated inner lens comprises a molded element coated with a chrome layer.

15. The ornamental device of claim 14, wherein the molded element coated with a chrome layer comprises a molded transparent element coated with the chrome layer.

16. The ornamental device of claim 14, wherein the molded element coated with a chrome layer comprises a molded translucent element coated with the chrome layer.

17. The ornamental device of claim 14, wherein the molded element coated with the chrome layer further comprises the molded element coated with a chrome layer applied using a physical vapor deposition process.

18. The ornamental device of claim 1, wherein the light pipe has a shape that approximates the shape of the backlit ornamental device.

19. An ornamental device including a decorative plated surface and a backlit assembly, comprising:
   a light engine including a light-emitting diode (LED);
   a light pipe optically coupled to the LED;
   a light diffuser;
   a lens assembly including a chrome surface finish, wherein the lens assembly encases the light engine, the light pipe and the light diffuser, and is assembled onto a back plate; and
   an emblem insert covering a first portion of the lens assembly;
   wherein when the LED is not illuminated, the lens assembly exhibits a chrome appearance through a second portion of the lens assembly not covered by the emblem insert.

20. An ornamental device including a decorative plated surface and a backlit assembly, comprising:
   a light engine including a light-emitting diode (LED);
   a light pipe optically coupled to the LED;
   a light diffuser;
   a lens assembly including a chrome surface finish, wherein the lens assembly encases the light engine, the light pipe and the light diffuser, and is assembled onto a back plate; and
   an emblem insert covering a first portion of the lens assembly;
   wherein when the LED is illuminated, light emanates through a second portion of the lens assembly not covered by the emblem insert.

* * * * *

UNITED STATES PATENT AND TRADEMARK OFFICE
CERTIFICATE OF CORRECTION

PATENT NO.         : 9,784,427 B2
APPLICATION NO.    : 14/808490
DATED              : October 10, 2017
INVENTOR(S)        : Joseph A. Stemmer et al.

Page 1 of 1

It is certified that error appears in the above-identified patent and that said Letters Patent is hereby corrected as shown below:

On the Title Page

Column 1 Item (72) Inventors should read:
Joseph A. Stemmer, Warren, MI (US)
Neil Naik, Shelby Township, MI (US)
Craig Bryan Law, Chatham, ONT (CA)
Jack Mekheel Bekou, Windsor, ONT (CA)
Jason Bruce Graham Keller, Northville, MI (US)
Robert Michael Joseph Cote, McGregor, ONT (CA)

Signed and Sealed this
Twenty-second Day of May, 2018

Andrei Iancu
*Director of the United States Patent and Trademark Office*